(12) United States Patent
Higuchi et al.

(10) Patent No.: US 8,472,882 B2
(45) Date of Patent: Jun. 25, 2013

(54) CHANNEL QUALITY INFORMATION REPORTING METHOD, BASE STATION, AND USER EQUIPMENT

(75) Inventors: Kenichi Higuchi, Yokohama (JP); Satoshi Nagata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 682 days.

(21) Appl. No.: 12/530,740

(22) PCT Filed: Mar. 12, 2008

(86) PCT No.: PCT/JP2008/054509
§ 371 (c)(1),
(2), (4) Date: Sep. 10, 2009

(87) PCT Pub. No.: WO2008/114661
PCT Pub. Date: Sep. 25, 2008

(65) Prior Publication Data
US 2010/0093287 A1    Apr. 15, 2010

(30) Foreign Application Priority Data

Mar. 20, 2007    (JP) .................................. 2007-073729

(51) Int. Cl.
*H04B 17/00* (2006.01)
(52) U.S. Cl.
USPC ..................................... 455/67.13; 455/67.11
(58) Field of Classification Search
None
See application file for complete search history.

(56) References Cited

U.S. PATENT DOCUMENTS

| | | | |
|---|---|---|---|
| 2004/0067757 A1* | 4/2004 | Fukui | 455/453 |
| 2005/0164641 A1* | 7/2005 | Niwano | 455/67.11 |
| 2005/0191965 A1* | 9/2005 | Yu et al. | 455/67.16 |
| 2006/0072510 A1* | 4/2006 | Aizawa | 370/333 |
| 2006/0087980 A1* | 4/2006 | Ikeda et al. | 370/252 |
| 2006/0089102 A1* | 4/2006 | Nishio et al. | 455/67.11 |
| 2007/0026808 A1 | 2/2007 | Love et al. | |

FOREIGN PATENT DOCUMENTS

| | | |
|---|---|---|
| CN | 1662097 A | 8/2005 |
| JP | 2005-244991 A | 9/2005 |
| JP | 3802914 B | 8/2006 |
| WO | 03/096577 A1 | 11/2003 |

OTHER PUBLICATIONS

3GPP TS 25.214 v7.3.0; "Physical layer procedures (FDD)"; Dec. 14, 2006 (60 pages).
International Search Report for PCT/JP2008/054509 mailed Apr. 15, 2008) (9 pages).
Written Opinion of ISA for PCT/JP2008/054509 mailed Apr. 15, 2008 (4 pages).

(Continued)

*Primary Examiner* — Yuwen Pan
*Assistant Examiner* — Ayodeji Ayotunde
(74) *Attorney, Agent, or Firm* — Osha Liang LLP

(57) ABSTRACT

A channel quality information reporting method of reporting channel quality information from user equipment to a base station is disclosed. The channel quality information reporting method includes a format determination step in which the base station determines a channel quality information format based on information of the user equipment, a format transmission step in which the base station transmits the determined channel quality information format to the user equipment, and a channel quality information generation step in which the user equipment generates the channel quality information based on the received channel quality information format.

9 Claims, 8 Drawing Sheets

OTHER PUBLICATIONS

3GPP TSG-RAN WG1 Meeting #42bis; Tdoc R1-051045 San Diego, USA; Oct. 10-14, 2005 Cite date Oct. 5, 2005 is from internet retrieval Source: Samsung Title: CQI Report and Scheduling Procedure.

3GPP TSG RAN WG1 Meeting #48; R1-070879 Feb. 12-16, 2007; St. Louis, U.S. Cite date Feb. 7, 2007 is from internet retrieval Source: NEC Group Title: Compressed CQI Reporting Scheme.

3GPP TSG RAN1 #47-bis; R1-070437 Sorrento, Italy; Jan. 15-19, 2007 Cite date Jan. 12, 2007 is from internet retrieval Source: Qualcomm Europe Title: Proposed Structure for UL ACK and CQI.

3GPP TSG RAN WG1 Meeting #48bis; R1-071652 St. Julians, Malta; Mar. 26-30, 2007 Cite date Mar. 23, 2007 is from internet retrieval Source: NTT DoCoMo, et al. Title: Basic Method for CQI Feedback in E-UTRA.

Japanese Office Action for Application No. 2007-073729, mailed on Aug. 23, 2011 (5 pages).

Patent Abstracts of Japan for Japanese Publication No. 2005-244991, publication date Sep. 8, 2005 (1 page).

Chinese Office Action for Application No. 200880007827.8, mailed on Mar. 27, 2012 (18 pages).

esp@cenet Patent Abstract for Chinese Publication No. 1662097, publication date Aug. 31, 2005. (1 page).

\* cited by examiner

PRIOR ART

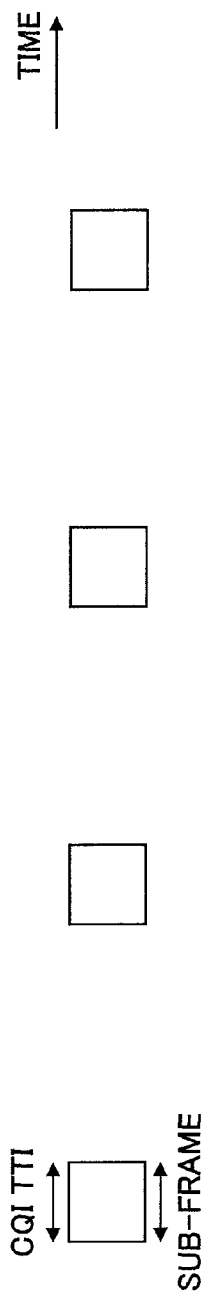
FIG.5A  PHYSICAL CHANNEL ALLOCATION
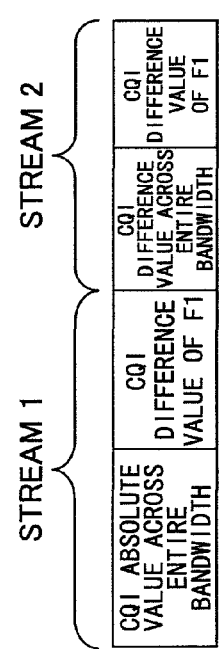
FIG.5B  CQI BITS CONFIGURATION IN CQI TTI (CASE 1)
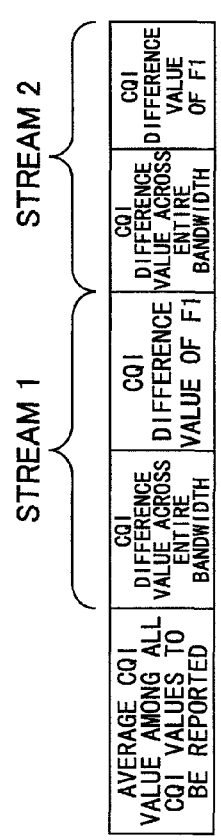
FIG.5C  CQI BITS CONFIGURATION IN CQI TTI (CASE 2)

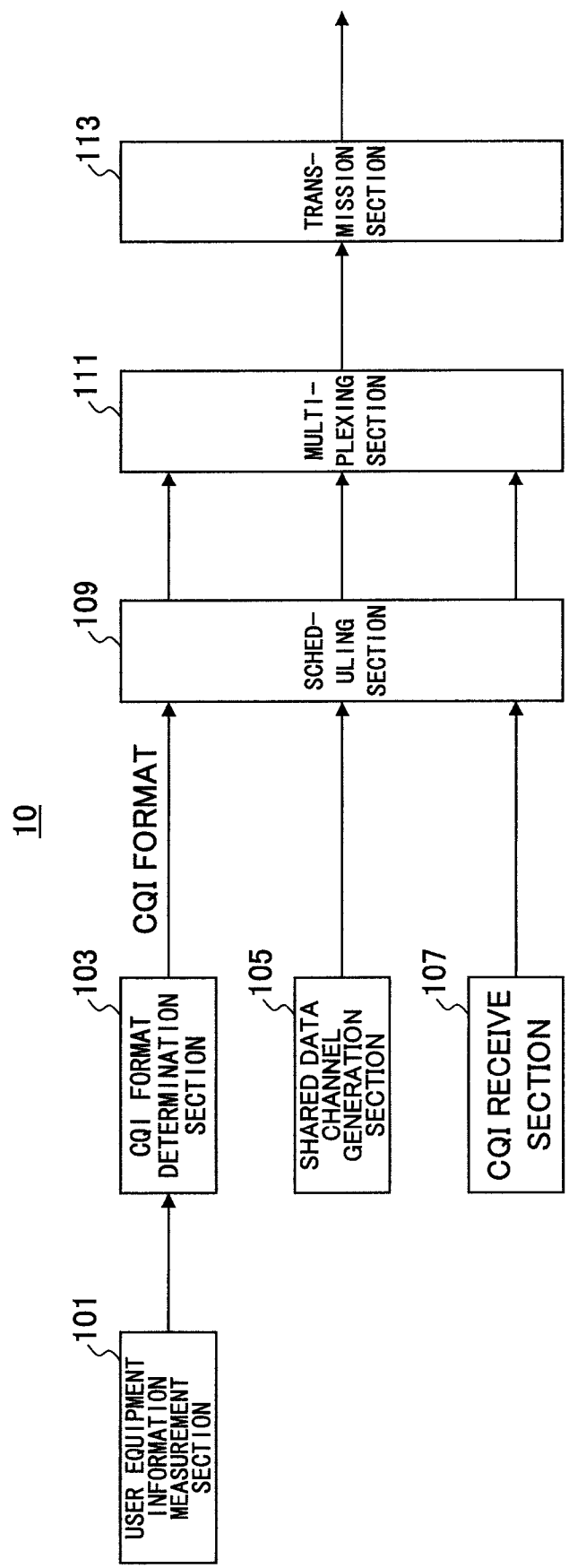

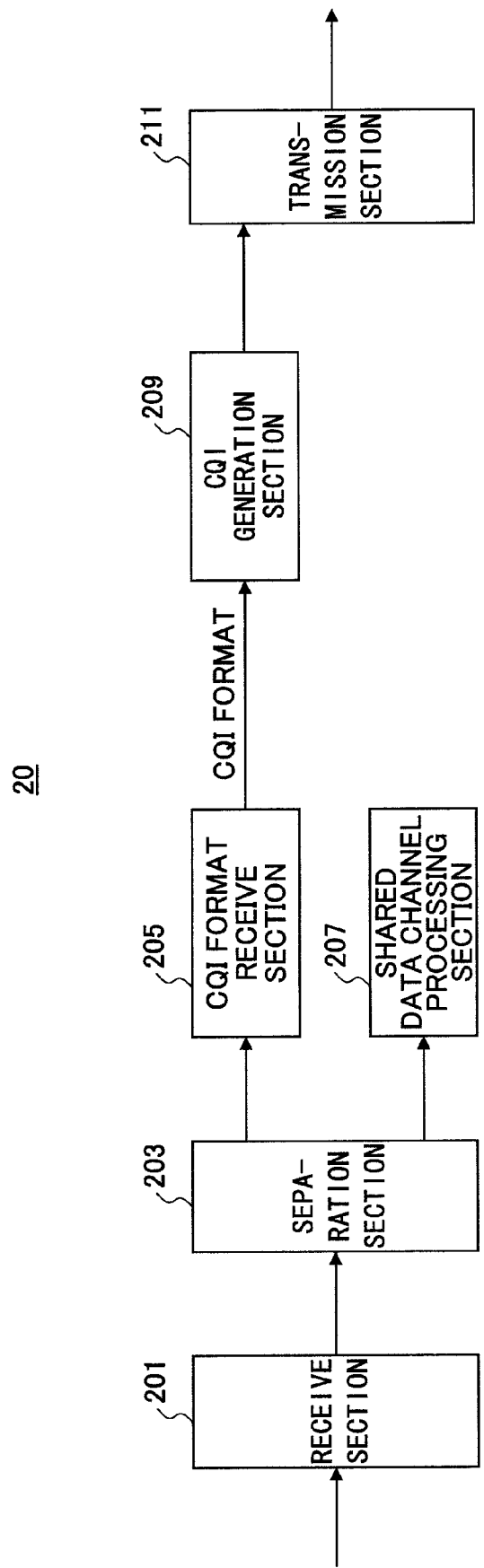

CHANNEL QUALITY INFORMATION REPORTING METHOD, BASE STATION, AND USER EQUIPMENT

TECHNICAL FIELD

The present invention generally relates to a channel quality information reporting method, a base station, and user equipment.

BACKGROUND ART

In an HSDPA (High Speed Downlink Packet Access) mobile communication environment, when a base station (eNodeB) performs scheduling to allocate radio resources to user equipment (hereinafter may be referred to as a user equipment terminal), a CQI (Channel Quality Indicator) reported from the user equipment is used. More specifically, the user equipment receives a pilot channel and the like from the base station, measures quality information such as an SIR (Signal to Interference Ratio), and feeds back the CQI to the base station. Based on the CQI reported from the user equipment, the base station performs the scheduling to adequately allocate the radio resources (see Non Patent Document 1).

In this case, however, a CQI report format, a CQI transmission time interval, and a CQI report cycle are constant as shown in FIG. 1. Namely user equipment transmits the CQI based on a predetermined format, TTI (Transmission Time Interval), and reporting cycle.

Non Patent Document 1: 3GPP TS 25.214, "Physical layer procedures (FDD)"

DISCLOSURE OF INVENTION

Problems to be Solved by the Invention

On the other hand, in a next-generation mobile communication environment such as 3GPP Evolved UTRA and UTRAN, a base station may allocate resources blocks to user equipment where the resource blocks are generated by dividing the system bandwidth in the frequency domain. In such a mobile communication environment, the user equipment has to periodically feed back the CQI with respect to each frequency band to the base station. Further, in an MIMO (Multi Input Multi Output) environment, the user equipment has to periodically feed back (report) the CQI with respect to each antenna of the base station to the base station.

However, an adequate amount of information in the frequency direction and in the time direction in the CQI report may vary depending on a channel status and a moving speed of the user equipment. For example, in a case where the channel status changes significantly, it may be desired that the CQI be fed back (reported) in detail. However, if the CQI is set to be fed back (reported) in more detail to respond to the requirement from the user equipment in the mobile communication system due to the significant change of the channel status, the uplink overhead may increase. On the other hand, if the CQI is set to be fed back (reported) in less detail (coarsely) in the mobile communication system, it may affect link adaptation (AMC (Adaptive Modulation and channel Coding), transmission power control) and scheduling.

In other words, an adequate CQI report format (the number of transmission bits or an MCS (Modulation and Coding Scheme)), the CQI transmission time interval, and the CQI report cycle may independently vary between different user equipment terminals. However, in a case as shown in FIG. 1 where the CQI report format, the CQI transmission time interval, and the CQI report cycle are constant, it may not be possible to achieve flexible CQI reports from the user equipment by individually changing the CQI report in accordance with the corresponding channel status of the user equipment.

The present invention is made to solve at least one of the problems described above and may provide an effective and flexible CQI report.

Means for Solving the Problems

According to an aspect of the present invention, there is provided a channel quality information reporting method of reporting channel quality information from user equipment to a base station. The channel quality information reporting method includes a format determination step in which the base station determines a channel quality information format based on information of the user equipment;

a format transmission step in which the base station transmits the determined channel quality information format to the user equipment; and a channel quality information generation step in which the user equipment generates the channel quality information based on the received channel quality information format.

According to another aspect of the present invention, there is provided a base station capable of receiving channel quality information from user equipment. The base station includes a channel quality information format determination section determining channel quality information format based on information of the user equipment;

a transmission section transmitting the determined channel quality information format to the user equipment; and a channel quality information receive section receiving the channel quality information based on the determined channel quality information format.

According to another aspect of the present invention, there is provided user equipment capable of transmitting channel quality information to a base station. The user equipment includes a receive section configured to receive a channel quality information format determined by the base station based on information of the user equipment; and a channel quality information generation section configured to generate the channel quality information based on the received channel quality information format.

Advantageous Effect of the Invention

According to an embodiment of the present invention, an effective and flexible CQI report may be provided.

BRIEF DESCRIPTION OF THE DRAWINGS

FIGS. 5A, 5B, and 5C are drawings showing configurations of the CQI feedback channel when priority is placed on a CQI report in a time domain;

FIG. 7 is a block diagram of a base station according to an embodiment of the present invention; and FIG. 8 is a block diagram of user equipment according to an embodiment of the present invention.

EXPLANATION OF REFERENCES

10: BASE STATION
101: USER EQUIPMENT INFORMATION MEASUREMENT SECTION
103: CQI FORMAT DETERMINATION SECTION
105: SHARED DATA CHANNEL GENERATION SECTION
107: CQI RECEIVE SECTION
109: SCHEDULING SECTION
111: MULTIPLEXING SECTION
113: TRANSMISSION SECTION
20: USER EQUIPMENT
201: RECEIVE SECTION
203: SEPARATION SECTION
205: CQI FORMAT RECEIVE SECTION
207: SHARED DATA CHANNEL PROCESSING SECTION
209: CQI GENERATION SECTION
211: TRANSMISSION SECTION

BEST MODE FOR CARRYING OUT THE INVENTION

Embodiments of the present invention are described below with respect to the accompanying drawings.

According to an embodiment of the present invention, to provide an effective and flexible CQI report, a base station is configured to separately determine a CQI format (CQI report format (the number of transmission bits or an MCS (Modulation and Coding Scheme)), a CQI transmission time interval, and a CQI report cycle) with respect to the user equipment.

Figure 1:
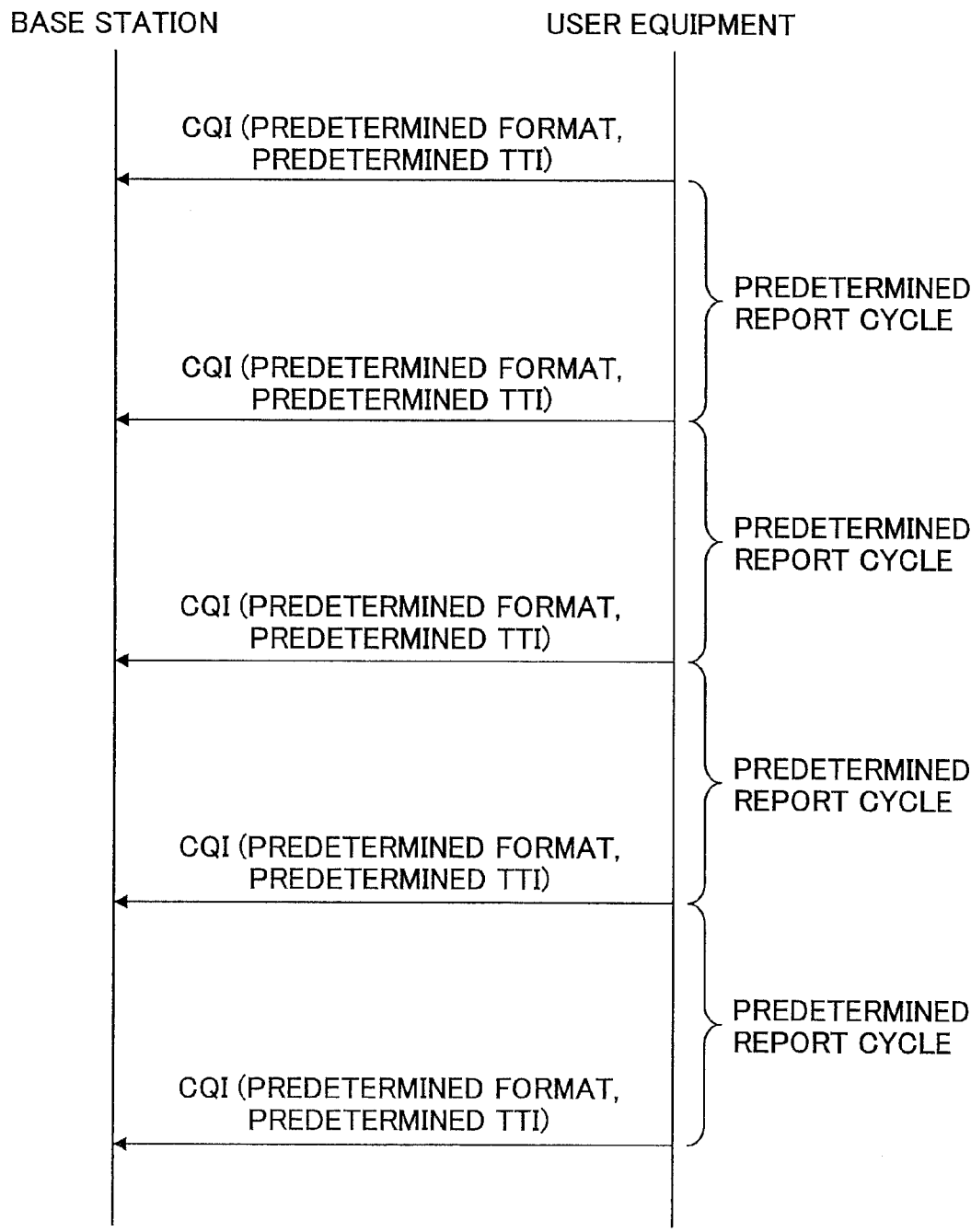
FIG. 1 is a schematic drawing showing a conventional CQI feedback method.
Figure 2:
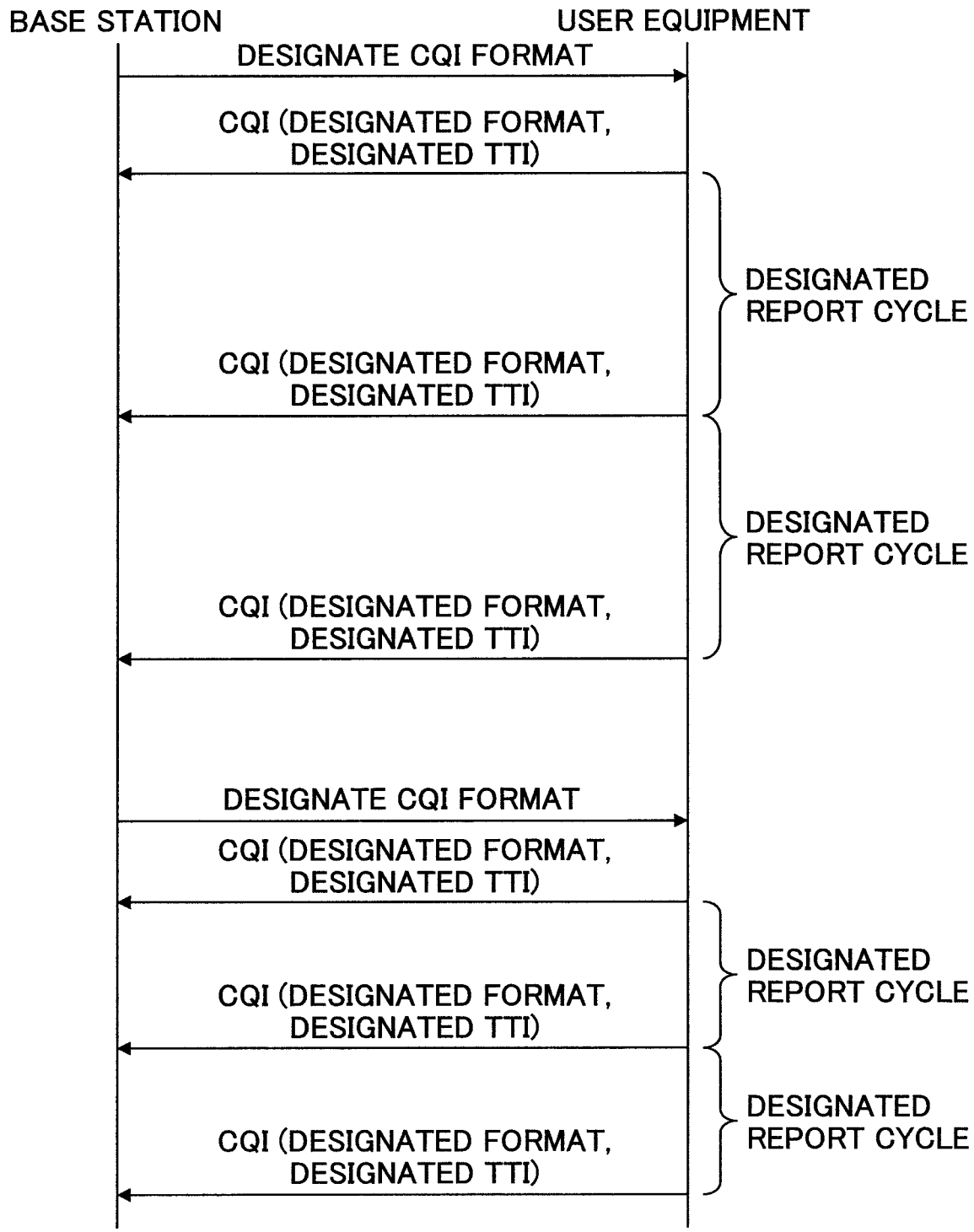
FIG. 2 is a schematic drawing showing a CQI feedback method according to an embodiment of the present invention.

Further, as shown in FIG. 2, the base station selects an optimal CQI format from among plural candidate CQI formats based on the information items (such as data rate, data size, and the like) received from the user equipment upon initiating the communications. Further, the base station may select the optimal CQI format by measuring delay spread or estimating a moving speed of the user equipment based on an uplink received signal from the user equipment and taking a result of the measurement or estimation into consideration.

The selected CQI format is reported to the user equipment through upper-layer signaling. In accordance with the selected CQI format (designated CQI report format (the number of transmission bits or the MCS), designated CQI transmission time interval, and designated CQI report cycle), the user equipment transmits the CQI to the based station The optimal CQI report format, CQI transmission time interval, and CQI report cycle may vary depending on the channel status of the user equipment; therefore, when an embodiment of the present invention is used, an effective and flexible CQI report may be provided. Further, by selecting an optimal CQI format for the user equipment from among plural candidate formats, it may become possible to correspond to the somewhat flexible number of CQI report bits by using limited formats.

Configuration of Feedback Channel

Figure 3A:
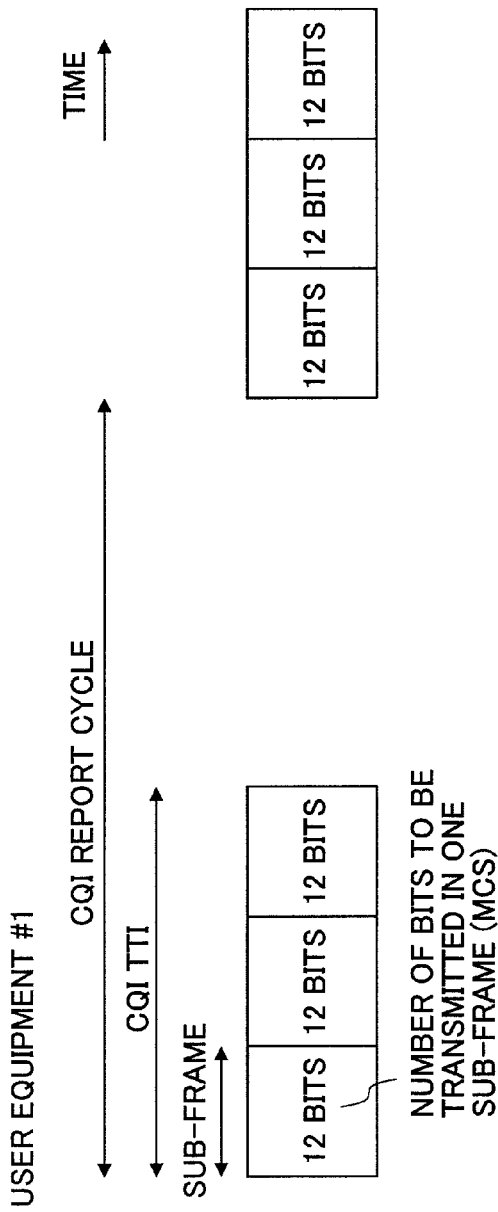
FIGS. 3A and 3B are drawings showing physical configurations of CQI feedback channels according to an embodiment of the present invention.
Figure 3B:
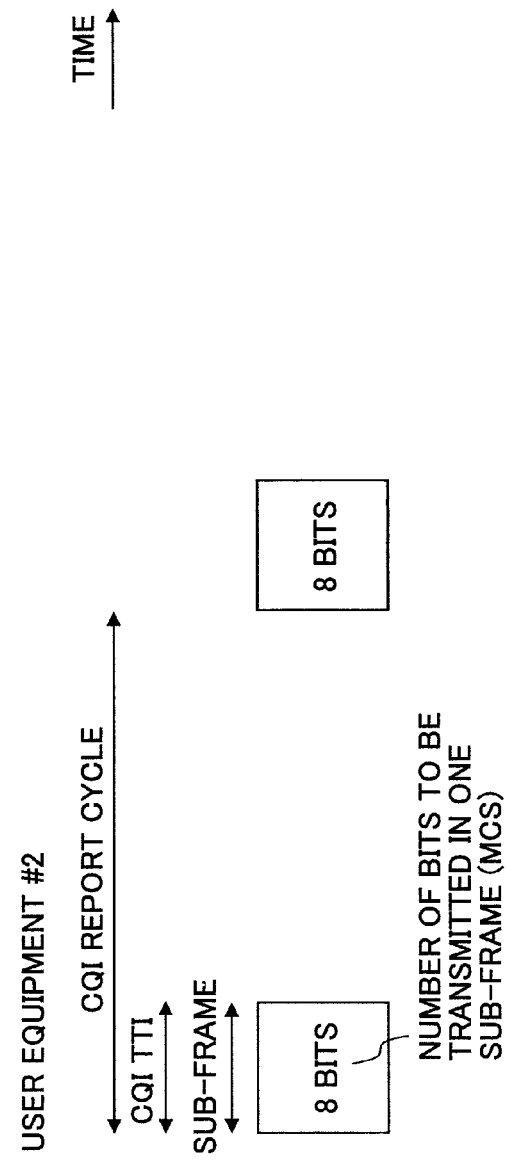

FIGS. 3A and 3B show physical configurations of CQI feedback channels according to an embodiment of the present invention. The base station may change at least one of the CQI report cycle, CQI transmission time interval, and the number of transmission bits in one sub-frame or the MCS in the CQI format. Herein, the CQI report cycle refers to a time interval between when a CQI report is transmitted and when the next CQI report is transmitted. The CQI transmission time interval refers to a time period occupied by a sub-frame(s) used for a single CQI report. Further, to change the number of transmission bits in one sub-frame has the same meaning as to change the MCS.

A value of CQI (CQI value) is generally determined based on path loss, shadowing, and fading; therefore when the CQI values are measured at closer frequencies, time, or antennas, the measured CQI values become basically similar values (this is because the path loss and the shadowing have a similar effect). By taking these into consideration, an effective and flexible CQI report is described below.

As shown in FIG. 3, for example, for user equipment #1 in a channel status of a large frequency fluctuation, a longer CQI transmission time interval is set and the number of transmission bits in one sub-frame is increased. On the other hand, for user equipment #2 in a channel status of a large time fluctuation, a shorter CQI report cycle is set.

By doing this, depending on the channel status of the user equipment, the base station may separately determine the CQI format (CQI report format (the number of transmission bits or the MCS, the CQI transmission time interval, and the CQI report cycle with respect to the user equipment.

Figure 4A:
FIGS. 4A, 4B, and 4C are drawings showing configurations of the CQI feedback channels when priority is placed on a CQI report in a frequency domain.
Figure 4B:
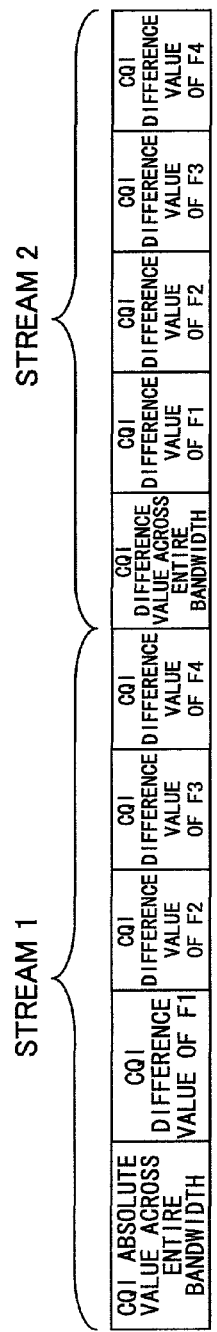
Figure 4C:
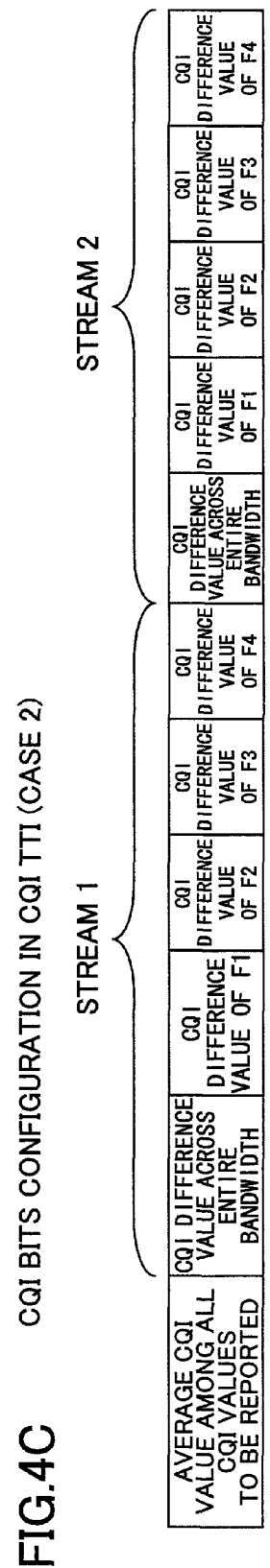

FIGS. 4A, 4B, and 4C show configurations of the CQI feedback channels when a higher priority is placed on the CQI reports in a frequency domain. Namely when the delay spread of the user equipment is large (i.e., when a fluctuation of the channel status in the frequency direction is large), it may be necessary to put a higher priority on the CQI reports in the frequency domain. To that end, a physical channel having a longer CQI transmission time interval is allocated to the CQI feedback channel. Further, a longer CQI report cycle is to be provided.

Upon transmitting the CQI bits in one CQI transmission time interval, the user equipment may report a CQI across the entire system bandwidth and a CQI of the frequency band where the channel status is in good condition instead of reporting the absolute measured value of all the resource blocks. Further alternatively, the user equipment may report the absolute value of the CQI across the entire system bandwidth and the difference values from the absolute value. FIGS. 4B and 4C show CQI formats where CQI values of four frequency bands (F1, F2, F3, and F4) having a good channel status with respect to each of two antennas are reported using the difference values from a reference absolute value. For example, as shown in FIG. 4B, a CQI average value across the entire bandwidth with respect to a first antenna is reported as an absolute value and top four CQI values having a good channel status and arranged in the descending order are reported as the difference values. As for a second antenna, a difference value between the average value across the entire bandwidth with respect to the first antenna and an average value across the entire bandwidth with respect to a second antenna is reported as a difference value and top four CQI values having a good channel status and arranged in the descending order are reported as the difference values. On the other hand, as shown in FIG. 4C, a CQI average value across all the CQI values to be reported is reported as a reference absolute value and top four CQI values having a good channel status in both stream 1 and stream 2 and arranged in the descending order are reported as the difference values. By using both absolute value and difference values, it may become possible to reduce the number of bits representing the CQI report. Especially when the CQI value across the entire bandwidth and the CQI values of the corresponding frequencies are similar to each other (i.e., when differences between the CQI values are limited (small)), the number of bits representing the CQI report may be more reduced when the configuration shown in FIG. 4B is applied. On the other hand, when the difference between the CQI values are relatively large, the number of bits representing the difference values may be more reduced when the configuration shown in FIG. 4C is applied, thereby enabling reducing the total number of bits representing the CQI report. Further, the larger the number of MIMO multiplexing, the larger is the number of bits for transmission that may be used (i.e., the number of bits used for the transmission may accordingly be increased).

By using the CQI format determined as described above, user equipment terminals may collectively encode the CQI values to be transmitted within one CQI transmission time interval. Namely the user equipment reports the CQI values using an absolute value as a reference value and the difference values from the absolute value in the frequency direction or in the space (stream) direction of the MIMO transmissions. The CQI value is determined based on the path loss, shadowing, and fading. Further, in a case where frequencies or antennas are close to each other, the path loss and the shadowing show similar characteristics; therefore CQI values in this case are likely to have similar values. Because of this feature, by using difference values, it may become possible to reduce the number of CQI reports and provide efficient CQI reports.

On the other hand, the user equipment may collectively encode the CQI values within one CQI transmission time interval. Namely in the time direction (within the CQI Time Transmission Interval), a value measured or estimated within the CQI time transmission interval (an absolute value which is not based on a difference value from the CQI value of the previous CQI Time Transmission Interval) is used. By not using the difference value from the CQI value of the previous CQI Time Transmission Interval, it may become possible to prevent error propagation in a CQI Time Transmission Interval after a previous CQI Time Transmission Interval where an error is received (i.e., if a first CQI value in a first CQI Time Transmission Interval is expressed by using a difference value based on a second CQI value of a previous second CQI Time Transmission Interval where the second CQI value of the second previous Time Transmission Interval is not correctly decoded, the first CQI value expressed (calculated) by using the difference value based on the second (previous) CQI Time Transmission Interval may be a wrong received value). By doing this way, it may become possible to provide a high-quality, low-delayed, and high-efficiency CQI report.

FIGS. 5A, 5B, and 5C show configurations of the CQI feedback channels when a higher priority is placed on the CQI reports in a time domain. Namely when the moving speed of the user terminal is high (i.e., when the change of the channel status in the time direction is large), it may be necessary to put a higher priority on the CQI reports in the time domain. To that end, a physical channel having a shorter CQI transmission time interval is allocated to the CQI feedback channel. Further, a shorter CQI report cycle is to be provided.

Similar to FIGS. 4A through 4C, FIGS. 5A through 5C show CQI formats including one CQI value having a good channel status with respect to each of the two antennas. In a case where a fluctuation of the channel status in the frequency direction is small, a smaller number of frequencies of the CQI values to be reported may be enough. This is why the number of frequency bands to be reported to the base station in FIG. 5 is less than that in FIG. 4. In this case as well, when differences between the CQI values are limited (small), the number of bits for the CQI reports may be more reduced when the configuration shown in FIG. 5B is applied. On the other hand, when the difference between the CQI values are relatively large, the number of bits representing the difference values may be more reduced when the configuration shown in FIG. 5C is applied.

Similar to the case of FIG. 4, based on the CQI format determined as described above, the user equipment may collectively encode the CQI values to be transmitted within one CQI transmission time interval. Namely the user equipment reports the CQI values using the difference value in the frequency direction or in the space (stream) direction. By doing this, the number of the CQI reports may be reduced so that an efficient CQI report may be provided. Further, the user equipment may collectively encode the CQI values within one CQI transmission time interval so that error propagation along the time direction can be prevented. By doing this, high-quality, short-delay, and high-efficiency CQI reports may be provided.

Further, when the CQI is required to be transmitted along with other control information such as ACK (Acknowledgement information) or NACK (Negative Acknowledgement information), necessary resources for the ACK and NACK may be provided by puncturing coded bits of the CQI. In this case, ACK, NACK, and CQI are collectively coded.

Flowchart of CQI Reporting Method

Figure 6:
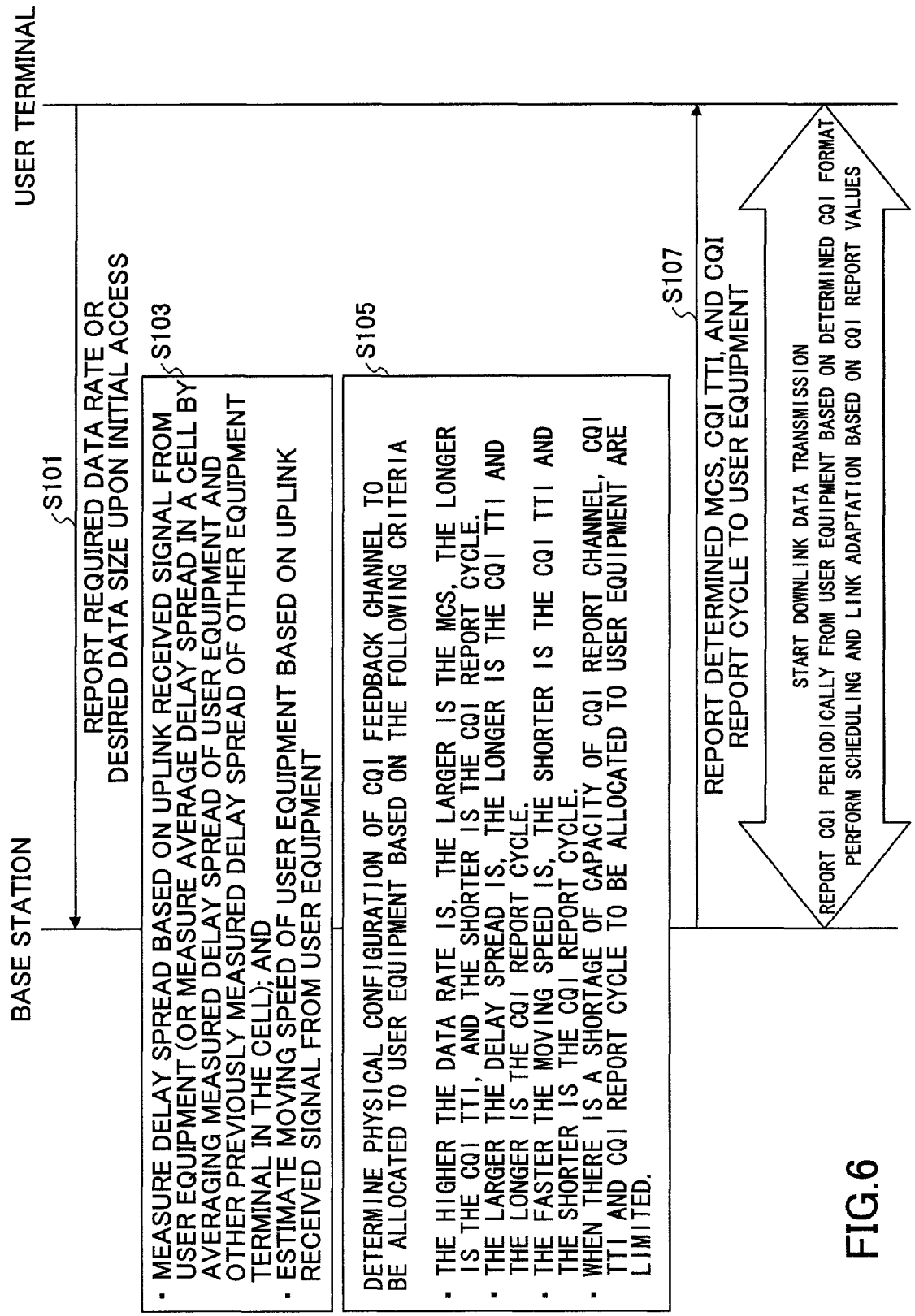
FIG. 6 is a flowchart showing a CQI reporting method according to an embodiment of the present invention.

FIG. 6 is a flowchart showing a CQI reporting method according to an embodiment of the present invention.

In step S101, in an initial access, the user equipment reports a required data rate or a desired data size to the base station.

In step S103, the base station measures the delay spread of the user equipment based on an uplink received signal from the user equipment. Otherwise, the base station may measures (calculates) an average delay spread value in a cell by averaging the measured delay spread value of the user equipment and other previously measured delay spread values of the other user equipment in the cell. Further, the base station estimates the moving speed of the user equipment based on an uplink received signal from the user equipment.

In step S105, the base station determines the CQI format so that the higher the data rate is, the larger is the number of the transmission bits (MCS), the longer is the CQI transmission time interval, and the shorter is the CQI report cycle that may be allowed to be set up. Further, the base station determines the CQI format so that the larger the delay spread (average delay spread) of the user equipment is, the longer is the CQI transmission time interval, and the longer is the CQI report cycle that may be allowed to be set up. Further, the base station determines the CQI format so that the faster the moving speed of the user equipment is, the shorter is the CQI transmission time interval and the shorter is the CQI report cycle that may be allowed to be set up. However, in a case where there is a shortage of capacity in a CQI report channel, the base station may limit (control) the CQI transmission time interval and the CQI report cycle to be allocated to the user equipment.

In step S107, the base station reports the determined number of transmission bits (MCS), CQI transmission time interval, and CQI report cycle to the user equipment.

Then, downlink data transmission is started. More specifically, based on the determined (CQI) format, the user equipment reports the CQI to the base station, and, based on the received CQI from the user equipment, the base station performs the scheduling and the link adaptation.

Configuration of Base Station

FIG. 7 is a block diagram of a base station 10 according to an embodiment of the present invention. As shown in FIG. 7, the base station 10 includes a user equipment information measurement section 101, a CQI format determination section 103, a shared data channel generation section 105, a CQI receive section 107, a scheduling section 109, a multiplexing section 111, and a transmission section 113.

The user equipment information measurement section 101 measures (receives, estimates) information of the user equipment. More specifically, upon starting communications, the user equipment information measurement section 101 receives the required data rate or the desired data size from the user equipment, measures the delay spread of the user equipment based on an uplink received signal from the user equipment, and estimates the moving speed of the user equipment based on an uplink received signal from the user equipment.

The CQI format determination section 103 determines the CQI format (CQI report format (the number of transmission bits or the MCS, the CQI transmission time interval, and the CQI report cycle) based on the information of the user equipment. More specifically, in the determination by the CQI format determination section 103, the higher the required data rate is, the larger the number of bits to be transmitted in one sub-frame becomes, the longer the CQI transmission time interval becomes, and the shorter the CQI report cycle becomes. Further, the larger the delay spread is, the longer the CQI transmission time interval becomes and the longer the CQI report cycle becomes. Further, the faster the moving speed of the user equipment is, the shorter the CQI transmission time interval becomes and the shorter the CQI report cycle becomes. The CQI format may be selected from among plural candidate formats. The determined CQI format is allocated to an upper-layer control channel, multiplexed into the shared data channel in the multiplexing section 111, and transmitted from the transmission section 113 to the user equipment.

On the other hand, the CQI receive section 107 receives the CQI from the user equipment in accordance with the CQI format determined by the CQI format determination section 103. The shared data channel generation section 105 generates a shared channel to be transmitted to the user equipment. Based on the CQI, the scheduling section 109 allocates radio resources to the shared channel to be transmitted to the user equipment.

Configuration of User Equipment

FIG. 8 is a block diagram of user equipment 20 according to an embodiment of the present invention. As shown in FIG. 8, the user equipment 20 includes a receive section 201, a separation section 203, a CQI format receive section 205, a shared data channel processing section 207, a CQI generation section 209, and a transmission section 211.

The receive section 201 receives a signal from the base station 10. The separation section separates the received signal into the shared data channel and the upper-layer control channel and the like. The separated shared data channel is processed by the shared data channel processing section 207.

The CQI format receive section 205 receives the CQI format from the upper-layer control channel. The CQI generation section 209 generates the CQI based on the designated CQI format (CQI report format (the number of transmission bits or the MCS, the CQI transmission time interval), and the CQI report cycle). The transmission section 211 transmits the generated CQI to the user equipment.

The present invention is described above by referring to specific embodiments. However, a person skilled in the art may understand that the above embodiment is described for illustrative purpose only and may think of examples of various modifications, transformations, alterations, changes, and the like without departing from the scope of claims.

The present international application claims priority from Japanese Patent Application No. 2007-073729 filed on Mar. 20, 2007, the entire contents of which are hereby incorporated herein by reference.

The invention claimed is:

1. A channel quality information reporting method of reporting channel quality information from user equipment to a base station, the method comprising:
    a format determination step in which the base station determines a channel quality information format based on information of the user equipment;
    a format transmission step in which the base station transmits the determined channel quality information format to the user equipment;
    a channel quality information generation step in which the user equipment generates the channel quality information based on the received channel quality information format, the channel quality information format including at least one of a CQI report cycle, a CQI transmission time interval, and a number of bits to be transmitted in one sub-frame; and
    a receiving step in which the base station receives a required data rate from the user equipment upon being connected to the user equipment;
    wherein, in the format determination step, the higher the required data rate is, the larger the number of bits to be transmitted in one sub-frame becomes, the longer the CQI transmission time interval becomes, and the shorter the CQI report cycle becomes; and
    wherein, in the channel quality information generation step, when channel quality information in a frequency direction or in a space direction is to be generated, the channel quality information including an absolute value representing channel quality information as a reference and a difference value from the absolute value are generated, and when channel quality information in a time direction is to be generated, the channel quality information including a value measured or calculated in the CQI transmission time interval is generated.

2. A channel quality information reporting method of reporting channel quality information from user equipment to a base station, the method comprising:
    a format determination step in which the base station determines a channel quality information format based on information of the user equipment;
    a format transmission step in which the base station transmits the determined channel quality information format to the user equipment;
    a channel quality information generation step in which the user equipment generates the channel quality information based on the received channel quality information format, the channel quality information format including at least one of a CQI report cycle, a CQI transmission time interval, and a number of bits to be transmitted in one sub-frame; and
    a measurement step in which the base station measures fluctuation of a channel status in a frequency direction based on a received signal from the user equipment,
    wherein, in the format determination step, the larger the fluctuation of the channel status in the frequency direction is, the longer the CQI transmission time interval becomes, and the longer the CQI report cycle becomes; and wherein, in the channel quality information generation step, when channel quality information in a frequency direction or in a space direction is to be generated, the channel quality information including an absolute value representing channel quality information as a reference and a difference value from the absolute value are generated, and when channel quality information in a time direction is to be generated, the channel quality information including a value measured or calculated in the CQI transmission time interval is generated.

3. The channel quality information reporting method according to claim 1, wherein
in the format determination step, one format is selected from among plural candidate formats.

4. A channel quality information reporting method of reporting channel quality information from user equipment to a base station, the method comprising:
a format determination step in which the base station determines a channel quality information format based on information of the user equipment;
a format transmission step in which the base station transmits the determined channel quality information format to the user equipment;
a channel quality information generation step in which the user equipment generates the channel quality information based on the received channel quality information format, the channel quality information format including at least one of a CQI report cycle, a CQI transmission time interval, and a number of bits to be transmitted in one sub-frame; and
an estimation step in which the base station estimates a moving speed of the user equipment based on a received signal from the user equipment,
wherein, in the format determination step, the faster the moving speed is, the shorter the CQI transmission time interval becomes and the shorter the CQI report cycle becomes; and
wherein, in the channel quality information generation step, when channel quality information in a frequency direction or in a space direction is to be generated, the channel quality information including an absolute value representing channel quality information as a reference and a difference value from the absolute value are generated, and when channel quality information in a time direction is to be generated, the channel quality information including a value measured or calculated in the CQI transmission time interval is generated.

5. The channel quality information reporting method according to claim 1, wherein
in the channel quality information generation step, at least one of channel quality information across the entire system bandwidth and channel quality information of a frequency band having a good channel status is generated.

6. The channel quality information reporting method according to claim 1, wherein
in the channel quality information generation step, the channel quality information is generated by collectively coding the channel quality information to be transmitted in one CQI transmission time interval.

7. The channel quality information reporting method according to claim 1, wherein
in the channel quality information generation step, when bits representing ACK or NACK and channel quality information are to be simultaneously transmitted, the channel quality information is generated by puncturing coded bits of the channel quality information.

8. A base station capable of receiving channel quality information from user equipment, comprising:
a channel quality information format determination section configured to determine a channel quality information format based on information of the user equipment, the channel quality information format including at least one of a CQI report cycle, a CQI transmission time interval, and a number of bits to be transmitted in one sub-frame;
a transmission section configured to transmit the determined channel quality information format to the user equipment;
a channel quality information receive section configured to receive the channel quality information based on the determined channel quality information format; and
the base station configured to receive a required data rate from the user equipment upon being connected to the user equipment;
wherein the higher the required data rate is, the larger the number of bits to be transmitted in one sub-frame becomes, the longer the CQI transmission time interval becomes, and the shorter the CQI report cycle becomes; and
wherein, in the channel quality information receive section, when channel quality information in a frequency direction or in a space direction is to be received, the channel quality information including an absolute value representing channel quality information as a reference and a difference value from the absolute value are received, and when channel quality information in a time direction is to be received, the channel quality information including a value measured or calculated in the CQI transmission time interval is received.

9. User equipment capable of transmitting a channel quality information to a base station, comprising:
a receive section configured to receive channel quality information format determined by the base station based on information of the user equipment, the channel quality information format including at least one of a CQI report cycle, a CQI transmission time interval, and a number of bits to be transmitted in one sub-frame; and
a channel quality information generation section configured to generate the channel quality information based on the received channel quality information format; and
the user equipment configured to transmit a required data rate from the user equipment upon being connected to the base station;
wherein the higher the required data rate is, the larger the number of bits to be transmitted in one sub-frame becomes, the longer the CQI transmission time interval becomes, and the shorter the CQI report cycle becomes; and
wherein, in the channel quality information generation section, when channel quality information in a frequency direction or in a space direction is to be generated, the channel quality information including an absolute value representing channel quality information as a reference and a difference value from the absolute value are generated, and when channel quality information in a time direction is to be generated, the channel quality information including a value measured or calculated in the CQI transmission time interval is generated.

* * * * *